(12) United States Patent
Ehrmann et al.

(10) Patent No.: US 10,690,005 B2
(45) Date of Patent: Jun. 23, 2020

(54) EXHAUST-GAS TURBOCHARGER

(71) Applicant: Bayerische Motoren Werke Aktiengesellschaft, Munich (DE)

(72) Inventors: Stefan Ehrmann, Fichtenau (DE); Harun Kara, Neufahrn b. Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 112 days.

(21) Appl. No.: 15/634,124

(22) Filed: Jun. 27, 2017

(65) Prior Publication Data
US 2017/0292406 A1    Oct. 12, 2017

Related U.S. Application Data

(63) Continuation of application No. PCT/EP2016/051636, filed on Jan. 27, 2016.

(30) Foreign Application Priority Data

Mar. 13, 2015   (DE) .................. 10 2015 204 563

(51) Int. Cl.
*F01D 11/00* (2006.01)
*F01D 25/18* (2006.01)
(Continued)

(52) U.S. Cl.
CPC ........... *F01D 25/186* (2013.01); *F01D 5/043* (2013.01); *F01D 5/046* (2013.01); *F01D 25/18* (2013.01);
(Continued)

(58) Field of Classification Search
CPC .... F01D 25/186; F01D 25/125; F01D 25/145; F01D 5/046; F16C 2360/24; F16C 33/10
(Continued)

(56) References Cited

U.S. PATENT DOCUMENTS 4,101,241 A * 7/1978 Kasuya ................. F01D 25/186
                                                    415/113
4,355,850 A * 10/1982 Okano .................... F01D 25/22
                                                    384/121
(Continued)

FOREIGN PATENT DOCUMENTS

DE          196 48 641 A1   5/1998
DE    10 2007 027 869 A1   12/2008
(Continued)

OTHER PUBLICATIONS

International Search Report (PCT/ISA/210) issued in PCT Application No. PCT/EP2016/051636 dated Apr. 15, 2016 with English translation (six pages).
(Continued)

*Primary Examiner* — Long T Tran
*Assistant Examiner* — James J Kim
(74) *Attorney, Agent, or Firm* — Crowell & Moring LLP

(57) ABSTRACT

An exhaust-gas turbocharger for an internal combustion engine has a turbine housing, in which a turbine wheel with a shaft is arranged rotatably. The shaft is mounted rotatably in a bearing housing via at least one piston ring adjacently with respect to the turbine wheel. The bearing housing has a lubricant inflow and a pressureless lubricant outflow for lubricating the shaft, wherein an insulating washer is provided which is clamped in by the turbine housing and the bearing housing and has an opening which is connected to the lubricant outflow in a manner which conducts a lubricant. Passage of lubricant out of the bearing housing into the turbine housing is avoided.

2 Claims, 2 Drawing Sheets

(51) Int. Cl.
*F01D 25/26* (2006.01)
*F01D 5/04* (2006.01)
*F02C 6/12* (2006.01)

(52) U.S. Cl.
CPC .............. *F01D 25/26* (2013.01); *F02C 6/12* (2013.01); *F05D 2220/40* (2013.01); *F05D 2260/98* (2013.01)

(58) Field of Classification Search
USPC .................... 415/112, 170.1, 174.5, 177
See application file for complete search history.

(56) References Cited

U.S. PATENT DOCUMENTS

| | | | | |
|---|---|---|---|---|
| 4,364,717 A * | 12/1982 | Schippers | ........... | F16C 33/1045 417/407 |
| 4,694,689 A * | 9/1987 | Kawasaki | .............. | G01M 1/04 73/114.77 |
| 4,735,556 A * | 4/1988 | Fujikake | .............. | F01D 25/145 165/904 |
| 5,028,208 A * | 7/1991 | Mitsubori | .............. | F01D 17/165 415/150 |
| 6,257,834 B1 * | 7/2001 | Bremer | .................. | F01D 25/12 415/176 |
| 7,631,497 B2 * | 12/2009 | Panek | .................. | F01D 25/186 60/605.1 |
| 8,001,781 B2 * | 8/2011 | Shibui | .................... | F02B 37/10 417/374 |
| 8,794,905 B2 * | 8/2014 | Matsuyama | .......... | F01D 25/186 415/111 |
| 9,982,557 B2 * | 5/2018 | Ward | .................... | F01D 17/165 |
| 2007/0089414 A1 * | 4/2007 | Yokoyama | .............. | F01D 9/026 60/605.1 |
| 2009/0196743 A1 * | 8/2009 | Ueno | .................... | F01D 11/003 415/174.5 |
| 2010/0043431 A1 * | 2/2010 | Thayer | .................... | F02B 39/00 60/605.3 |
| 2010/0192571 A1 * | 8/2010 | Boning | ................. | F01D 25/186 60/605.3 |
| 2011/0142604 A1 * | 6/2011 | Schumnig | .............. | F01D 25/24 415/170.1 |
| 2015/0037146 A1 * | 2/2015 | Yamaguchi | ........... | F01D 11/025 415/174.5 |
| 2016/0032768 A1 * | 2/2016 | Schumnig | .............. | F01D 25/24 415/177 |

FOREIGN PATENT DOCUMENTS

| | | |
|---|---|---|
| DE | 10 2010 053 497 A1 | 6/2012 |
| EP | 0 187 486 A1 | 7/1986 |
| EP | 2 511 543 A1 | 10/2012 |

OTHER PUBLICATIONS

German-language Written Opinion (PCT/ISA/237) issued in PCT Application No. PCT/EP2016/051636 dated Apr. 15, 2016 (six pages).
German Search Report issued in counterpart German Application No. 10 2015 204 563.3 dated Dec. 1, 2015 with partial English translation (10 pages).
Chinese-language Office Action issued in counterpart Chinese Application No. 201680003556.3 dated Jul. 8, 2019 with English translation (11 pages).

* cited by examiner

EXHAUST-GAS TURBOCHARGER

CROSS REFERENCE TO RELATED APPLICATIONS

This application is a continuation of PCT International Application No. PCT/EP2016/051636, filed Jan. 27, 2016, which claims priority under 35 U.S.C. § 119 from German Patent Application No. 10 2015 204 563.3, filed Mar. 13, 2015, the entire disclosures of which are herein expressly incorporated by reference.

BACKGROUND AND SUMMARY OF THE INVENTION

The invention relates to an exhaust-gas turbocharger for an internal combustion engine having a turbine housing in which a turbine wheel with a shaft is rotatably arranged, wherein the shaft is rotatably mounted in a bearing housing by way of at least one piston ring adjacent to the turbine wheel, and the bearing housing has, for the lubrication of the shaft, a lubricant inlet and an unpressurized lubricant outlet.

Exhaust-gas turbochargers have a dual housing in which, at one side, a turbine wheel and, at the other side, a compressor wheel on a shaft are rotatably mounted by way of radial bearings in a bearing housing. Here, the shaft may reach rotational speeds of, for example, up to 300,000 rpm. To accommodate axial forces that arise, it is also possible for at least one axial bearing to be provided. Here, the bearings are lubricated by a corresponding lubricant.

In the case of the exhaust-gas turbocharger, it is possible, owing to the oil-lubricated bearing arrangement thereof, for lubricant losses to occur, in particular into the turbine housing. For the exhaust-gas turbocharger, dynamic sealing is often realized by use of piston rings, though these cannot suitably prevent a passage of lubricant to the turbine side under all operating conditions. Owing to modern exhaust-gas technology, a passage of lubricant, in particular to the turbine side, must be avoided as far as possible, because this leads to sooting (deposition of tar-like substances) of the turbine wheel and/or to sooting of the catalytic converter, the effectiveness of which with regard to exhaust-gas purification is thereby severely impaired.

The German laid-open specification DE 10 2007 027 869 A1 discloses a turbocharger having a turbocharger housing. A leadthrough opening is provided for a shaft, wherein the shaft is rotatably mounted in the housing by way of a bearing arrangement. Lubricating oil is supplied to the bearing for lubrication purposes. A section of the shaft is provided at the outer side of at least one bearing, which section forms a gap with the housing. The gap is in the form of a lubricating oil throttle in order to at least reduce a passage of lubricating oil from the bearing side into the turbine housing.

A disadvantage of said known prior art is that a passage of lubricating oil via the bearings to the turbine side is merely reduced, and not prevented.

It is an object of the present invention to provide a measure to further reduce, or prevent, a passage of lubricant into the turbine housing.

This and other objects are achieved by an exhaust-gas turbocharger having a turbine housing in which a turbine wheel with a shaft is rotatably arranged, wherein the shaft is rotatably mounted in a bearing housing by way of at least one piston ring adjacent to the turbine wheel, and the bearing housing has, for the lubrication of the shaft, a lubricant inlet and an unpressurized lubricant outlet. Between the turbine wheel and the bearing housing, a thermal disk is arranged which is clamped by the turbine housing and the bearing housing and which has an opening connected in lubricant-conducting fashion to the lubricant outlet Lubricant which, by cohesion, is conveyed past the piston rings to the outside is advantageously returned to the lubricant circuit through the opening in the thermal disk and the corresponding bore in the bearing housing. This leads to a "dry" turbine housing and to a considerable reduction of lubricant residues (sooting) in the region of the piston rings.

An advantageous refinement of the invention provides a lubrication gap between the shaft and the bearing housing adjacent to the piston ring, which is connected in lubricant-conducting fashion to the lubricant outlet.

The lubricant which creeps via the piston rings is advantageously returned via the bore in the bearing housing and thus to the lubricant outlet.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
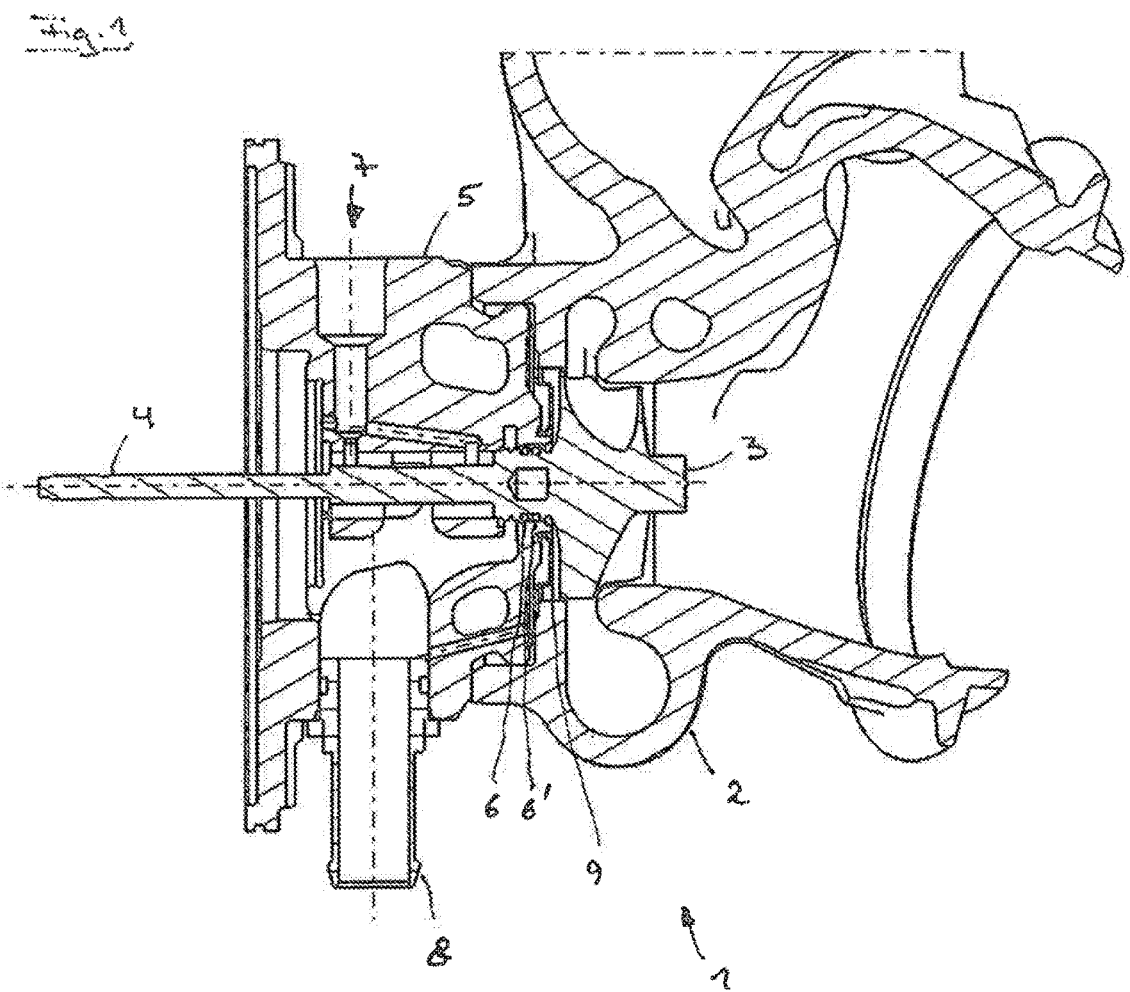
FIG. 1 is a cross-sectional view through an exhaust-gas turbocharger according to an embodiment of the invention.
Figure 2:
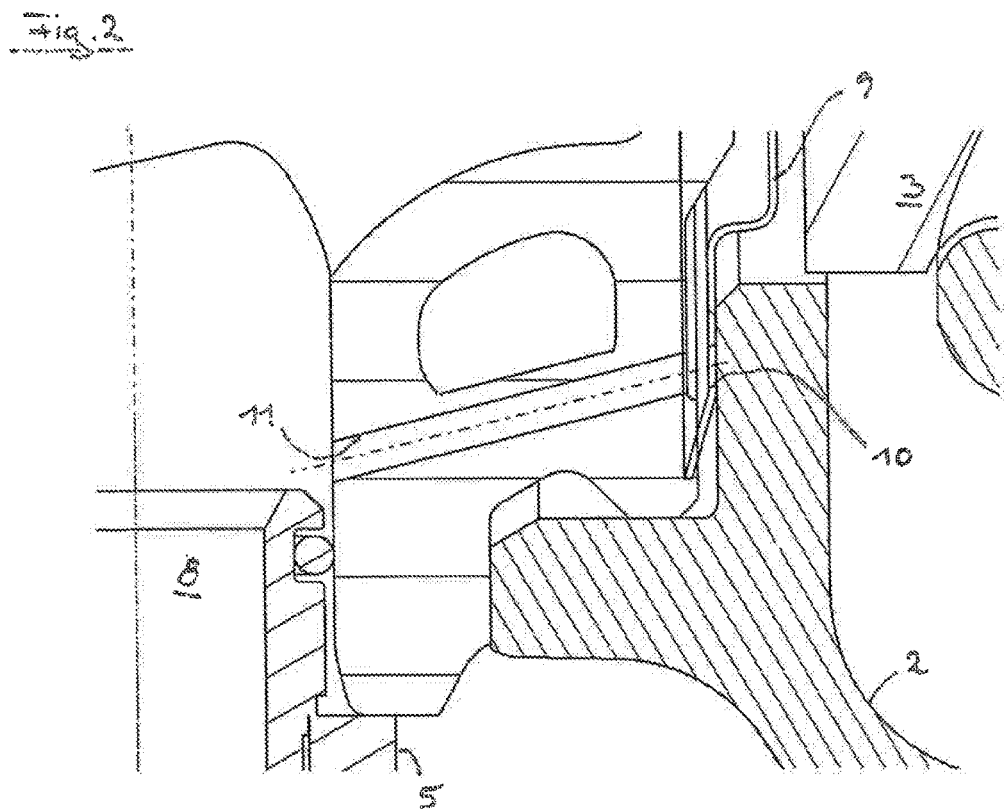
FIG. 2 shows a detail from FIG. 1.
Figure 3:
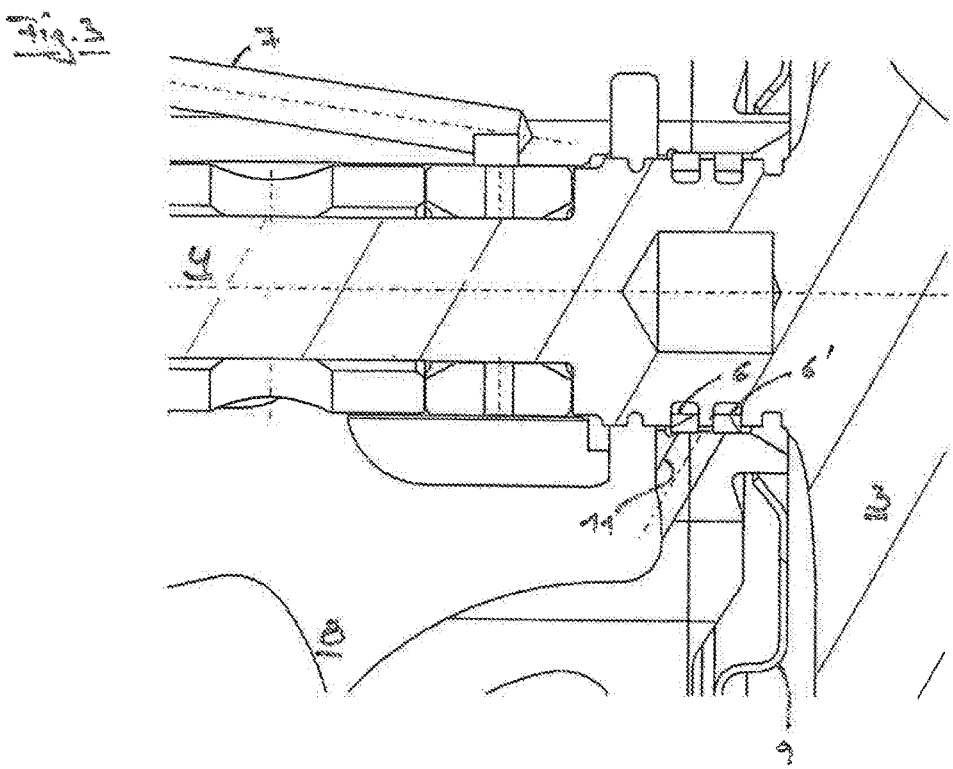
FIG. 3 shows another detail from FIG. 1.

In FIGS. 1 to 3, the same reference designations are used for identical components.

FIG. 1 shows a section through a turbine housing 2 of an exhaust-gas turbocharger 1, and a section through an associated bearing housing 5. The turbine housing 2 and the bearing housing 5 have a bore (not designated) in which a turbine wheel 3 is, by way of its shaft 4, rotatably mounted via two piston rings 6, 6' situated, in this exemplary embodiment, at the turbine side. A compressor wheel and a compressor housing of the exhaust-gas turbocharger 1 are not illustrated. The rotational speed of a generic turbine wheel 3 may reach up to 300,000 rpm.

For lubrication of the bearing arrangement, a lubricant inlet 7 is provided in the bearing housing 5, and a lubricant outlet 8 is provided for the discharge of the lubricant. Furthermore, a thermal disk 9 is provided, between the turbine wheel 3 and the bearing housing 5, as a heat shield for the bearing arrangement. The thermal disk is clamped by the turbine housing 2 and the bearing housing 5.

FIG. 2 shows an enlarged detail from FIG. 1 of the embodiment according to the invention. As can be seen in FIG. 2, it is possible between the turbine wheel 3 and the bearing housing 5 to see the thermal disk 9 clamped by the turbine housing 2 and by the bearing housing 5. The thermal disk 9 has an opening 10 which is connected in lubricant-conducting fashion to the lubricant outlet 8 via a bore 11. Owing to the embodiment according to the invention of the exhaust-gas turbocharger 1, therefore, a passage of lubricant from the bearing housing 5 into the turbine housing 2 is prevented, and sooting of the turbine wheel 3 and/or of a catalytic converter situated downstream in the exhaust-gas direction is reliably prevented.

FIG. 3 shows a detail view from FIG. 1 with the embodiment according to the invention. In the enlarged view, it is now possible to clearly see the piston rings 6, 6' for the shaft 4 of the turbine wheel 3. In the region of the piston rings 6, 6' there is situated a bore 11 according to the invention, which may, for example, be drilled or cast, and via which lubricant that creeps in the direction of the turbine wheel 3 is returned into the lubricant outlet 8. The phrase "in the region of or adjacent to the piston rings 6, 6'" means that the bore 11 is at a maximum distance of approximately 10 mm from the piston rings 6, 6'. To prevent excessive heating of the bearing housing 5, the thermal disk 9 is clamped by the turbine housing 2 and the bearing housing 5 so as to be situated between the turbine wheel 3 and the bearing housing 5.

| List of reference designations: | |
|---|---|
| 1 | Exhaust-gas turbocharger |
| 2 | Turbine housing |
| 3 | Turbine wheel |
| 4 | Shaft |
| 5 | Bearing housing |
| 6 | Piston ring |
| 6' | Piston ring |
| 7 | Lubricant inlet |
| 8 | Lubricant outlet |
| 9 | Thermal disk |
| 10 | Opening |
| 11 | Bore |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust-gas turbocharger for an internal combustion engine, comprising:
    a turbine housing in which a turbine wheel with a shaft is rotatably arranged,
    wherein
        the shaft is rotatably mounted in a bearing housing by way of at least one piston ring adjacent to the turbine wheel, and the bearing housing has, for lubricating the shaft, a lubricant inlet and an unpressurized lubricant outlet, and
        between the turbine wheel and the bearing housing, a thermal disk is arranged, which is clamped by the turbine housing and the bearing housing and which has an opening from a turbine wheel side of the thermal disk to a bearing housing side of the thermal disk, the opening being configured to connect a space adjacent to the turbine wheel side of the thermal disk in lubricant-conducting fashion to the lubricant outlet on the bearing housing side of the thermal disk.

2. The exhaust-gas turbocharger as claimed in claim 1, further comprising:
    a lubrication bore between the shaft and the bearing housing adjacent to the piston ring which is connected in lubricant-conducting fashion to the lubricant outlet.

* * * * *